US012801439B2

(12) United States Patent
Walls et al.

(10) Patent No.: US 12,801,439 B2
(45) Date of Patent: Nov. 17, 2026

(54) CONTROLLING CARBON EMISSION BY WORKLOAD AT STORAGE LEVEL

(71) Applicant: International Business Machines Corporation, Armonk, NY (US)

(72) Inventors: Andrew D. Walls, San Jose, CA (US); Amy Purdy Hirst, Poughkeepsie, NY (US); Ramakrishna Vadla, Hyderabad (IN); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 18/889,528

(22) Filed: Sep. 19, 2024

(65) Prior Publication Data

US 2026/0079751 A1 Mar. 19, 2026

(51) Int. Cl.
*G06F 12/00* (2006.01)
*G06F 9/50* (2006.01)

(52) U.S. Cl.
CPC .................................. *G06F 9/5027* (2013.01)

(58) Field of Classification Search
CPC .... G06F 9/5027; G06F 9/5088; G06F 9/5083; G06F 3/0646; G06F 17/16; G06N 3/08; G06N 3/006; G06N 3/045; G06N 3/0455; G06N 3/0895; G06N 3/09; G06N 3/092; G06N 3/0985; G06N 3/084; G06N 3/06; H04Q 2213/343; H04L 25/0254; G05B 2219/25255; G05B 2219/32335; G05B 2219/41054; G05B 2219/39271
See application file for complete search history.

(56) References Cited

U.S. PATENT DOCUMENTS

2011/0282982 A1 11/2011 Jain
2021/0373973 A1 12/2021 Ekins et al.
2023/0138727 A1 * 5/2023 Wong ............... G06Q 10/06375 705/7.37
2024/0354172 A1 * 10/2024 Aurongzeb ........... G06F 9/5088

OTHER PUBLICATIONS

Author unknown, "Dynamic Data Center Selection to Reduce Carbon Footprint," ip.com Prior Art Database, Feb. 24, 2020, 4 pages, priorart.ip.com, accessed Aug. 2, 2024, https://priorart.ip.com/IPCOM/000261340.

(Continued)

*Primary Examiner* — Shawn X Gu
(74) *Attorney, Agent, or Firm* — Yee & Associates, P.C.

(57) ABSTRACT

Carbon emissions by workload at the storage level is provided. A storage system that can run a workload within a remainder of a specified time period without exceeding a maximum carbon dioxide ($CO_2$) equivalent emission threshold level defined for the workload in a sustainability service level agreement (SLA) is identified based on analyzing retrieved $CO_2$ equivalent emission data in a time-series format from a plurality of storage controllers corresponding to a plurality of storage systems using a set of machine learning models. The workload is migrated to the identified storage system prior to the specified time period being met.

20 Claims, 5 Drawing Sheets

(56) References Cited

OTHER PUBLICATIONS

Author unknown, "Pure Storage Extends Leadership in Sustainability, Helping Customers Make Significant Strides on Their Environmental Journey," Pure Storage Press Releases, Sep. 21, 2022, 8 pages, purestorage.com, accessed Aug. 2, 2024, https://www.purestorage.com/company/newsroom/press-releases/pure-extends-leadership-in-sustainability.html.
Canali et al., "Joint Minimization of the Energy Costs From Computing, Data Transmission, and Migrations in Cloud Data Centers," IEEE Transactions on Green Communications and Networking, Jun. 2018, pp. 580-595, vol. 2, No. 2, ieee.org, accessed Aug. 2, 2024, https://ieeexplore.ieee.org/document/8267099.
Pathania et al., "Sustainability in Migrating Workloads to Public Clouds," 2020 35th IEEE/ACM International Conference on Automated Software Engineering Workshops (ASEW), Sep. 21-25, 2020, pp. 166-169, ieee.org, accessed Aug. 2, 2024, https://ieeexplore.ieee.org/document/9319307.
Wadhwa et al., "Energy Saving Approaches for Green Cloud Computing: A Review," 2014 Recent Advances in Engineering and Computational Sciences (RAECS), Mar. 6-8, 2014, 6 pages, ieee.org, accessed Aug. 2, 2024, https://ieeexplore.ieee.org/document/6799608.

* cited by examiner

COMPUTING ENVIRONMENT
100

CONTROLLING CARBON EMISSION BY WORKLOAD AT STORAGE LEVEL

BACKGROUND

The disclosure relates generally to storage systems and more specifically to carbon emissions generated by workloads running on storage systems.

In storage systems, watts per terabyte (watts/TB), input/output operations per second (IOPS) per watt (IOPS/watt), or the like causing carbon dioxide ($CO_2$) equivalent emissions while running workloads have become increasingly important to entities (e.g., enterprises, companies, businesses, organizations, institutions, and the like). IOPS is an input/output performance metric that characterizes storage devices, such as, for example, hard disk drives, solid-state drives, and storage area networks. A workload corresponds to a volume group. A volume group combines multiple physical or logical volumes to form a single storage system, equal to the storage capacity of the combined physical devices. The physical volumes or logical volumes can include, for example, hard disk drives, solid-state drives, storage area networks, and the like.

A $CO_2$ equivalent is a metric measure used to compare the emissions from various greenhouse gases on the basis of their global-warming potential by converting amounts of other gases to the equivalent amount of $CO_2$ with the same global-warming potential. $CO_2$ equivalents are commonly expressed as million metric tons of $CO_2$ equivalents. The $CO_2$ equivalent for a gas is derived by multiplying the million metric tons of the gas by the associated global-warming potential. For example, million metric tons of $CO_2$ equivalents=(a million metric tons of a gas)*(the global-warming potential of the gas). For example, the global-warming potential of methane is 25 and the global-warming potential of nitrous oxide 298. In other words, the emissions of 1 million metric tons of methane and nitrous oxide, respectively, is equivalent to emissions of 25 and 298 million metric tons of $CO_2$.

SUMMARY

According to one illustrative embodiment, a method is provided. A storage system that can run a workload within a remainder of a specified time period without exceeding a maximum carbon dioxide ($CO_2$) equivalent emission threshold level defined for the workload in a sustainability service level agreement (SLA) is identified based on analyzing retrieved $CO_2$ equivalent emission data in a time-series format from a plurality of storage controllers corresponding to a plurality of storage systems using a set of machine learning models. The workload is migrated to the storage system prior to the specified time period being met to decrease $CO_2$ equivalent emissions of the workload in accordance with the sustainability SLA. According to other illustrative embodiments, a computer system and computer program product are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
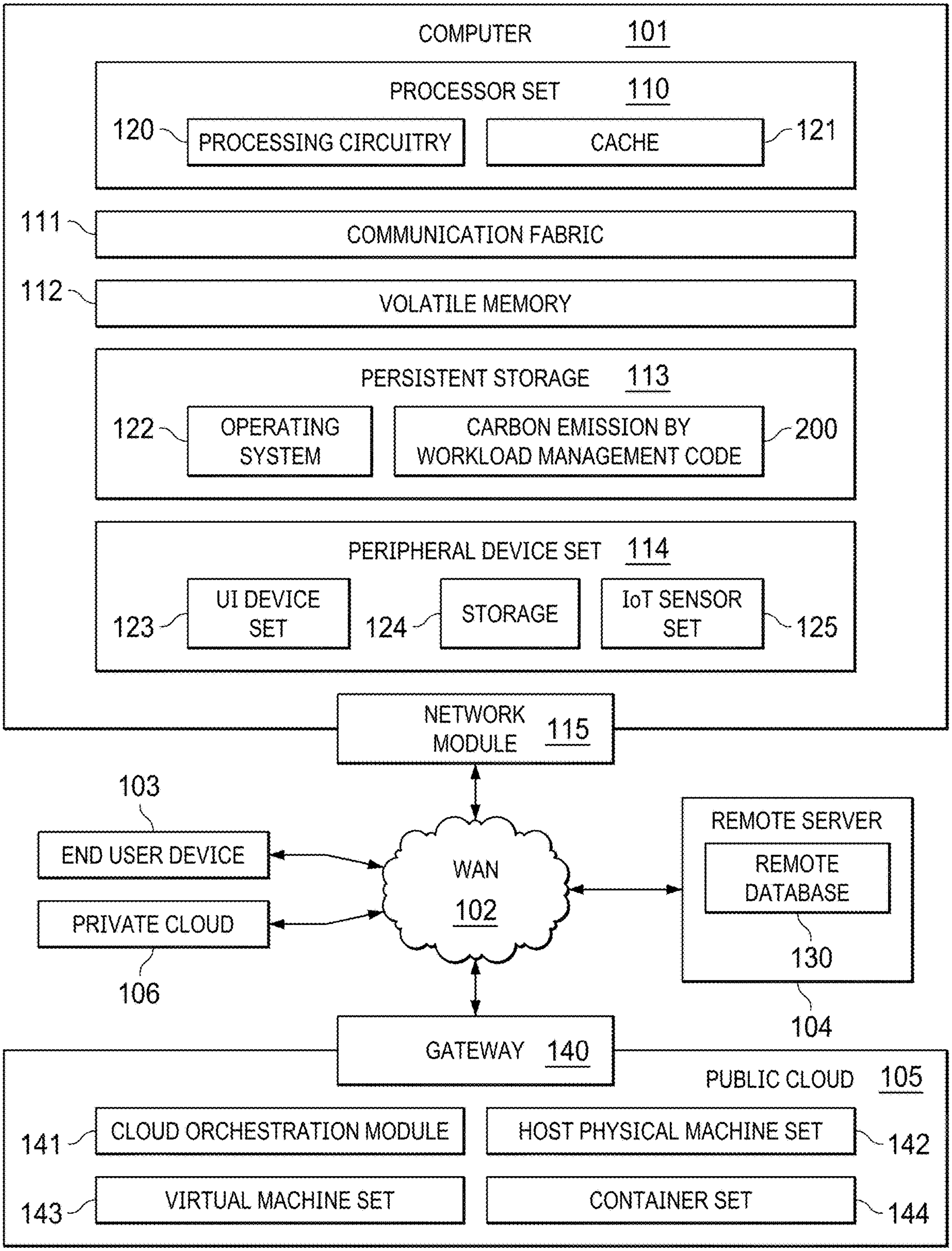
FIG. 1 is a pictorial representation of a computing environment in which illustrative embodiments may be implemented.
Figure 2:
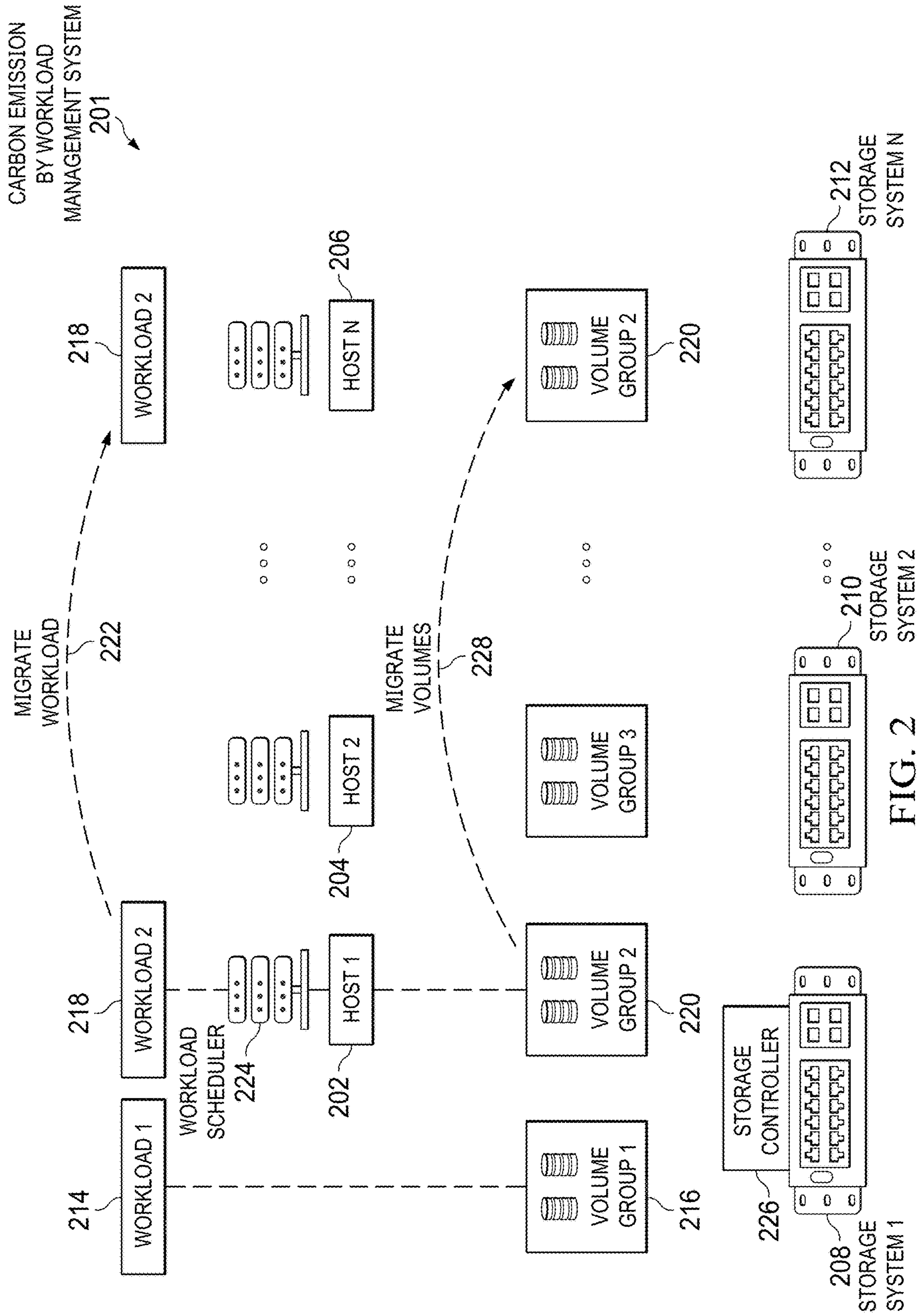
FIG. 2 is a diagram illustrating an example of a carbon emission by workload management system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as carbon emission by workload management code 200.

For example, carbon emission by workload management code 200 utilizes a sustainability service level agreement (SLA) tagging system to tag a dataset corresponding to a particular workload with a sustainability SLA defined by a user, such as, for example, a storage system administrator or the like, for that particular workload.

For example, carbon emission by workload management code 200 utilizes the sustainability SLA tagging system to tag the dataset corresponding to that particular workload with the sustainability SLA of 25 watts per terabyte (watts/TB) for a one-month time period. In other words, that particular workload cannot consume more than 25 watts/TB each month as defined by the sustainability SLA for that particular workload. Thus, the sustainability SLA defines a maximum carbon dioxide ($CO_2$) equivalent emission for a given workload running on a given storage system (e.g., that particular workload cannot consume more than "X" number of watts/TB while running on a particular storage system for a specified time period in accordance with the sustainability SLA for that particular workload).

In addition, carbon emission by workload management code 200 utilizes a workload scheduler, which includes a set of machine learning models, to ensure that the sustainability SLA is adhered to (i.e., not violated) by predicting when to automatically migrate a particular workload to a different storage system to decrease the $CO_2$ equivalent emission of that particular workload in accordance with the sustainability SLA. The different storage system, which the workload is migrated to, can be located in the same data center or hybrid cloud environment as the previous storage system or located in a different data center in a different geographic area or a different hybrid cloud environment. The workload scheduler can also take into account emergency conditions, such as, for example, when one or more data centers are located in a geographic area where power is mandated to be reduced due to heat buildup caused by a high-pressure weather system in that geographic area, while determining when to migrate workloads to different storge systems.

Carbon emission by workload management code 200 also utilizes a storage controller to tier a particular workload to a particular storage type in the same storage system of a data center or hybrid cloud environment to decrease the $CO_2$ equivalent emission of that particular workload in accordance with the sustainability SLA. Further, carbon emission by workload management code 200 utilizes storage controller to restrict access to a storage system by a particular workload when the maximum $CO_2$ equivalent emission threshold level corresponding to that particular workload over a defined time period is exceeded.

In addition to carbon emission by workload management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and carbon emission by workload management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 can take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in carbon emission by workload management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a storage system administrator of an entity that operates computer 101), and may take any of the forms discussed above in connection with computer 101. EUD 103 typically receives helpful and useful data from the operations of computer 101. For example, in a hypothetical case where computer 101 is designed to provide a carbon emission by workload at the storage level prediction to the end user, this prediction would typically be communicated from network module 115 of computer 101 through WAN 102 to EUD 103. In this way, EUD 103 can display, or otherwise present, the carbon emission by workload at the storage level prediction to the end user. In some embodiments, EUD 103 may be a client device, such as a thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a carbon emission by workload at the storage level prediction based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud environment.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In a growing sustainability-aware world, an entity, such as an enterprise, organization, or the like may opt to monitor its $CO_2$ equivalent emissions. Some entities have defined goals or mandates on the maximum $CO_2$ equivalent emissions these entities can emit in a given time period. The defined maximum $CO_2$ equivalent emissions for a given time period is known as a sustainability SLA. For an entity, running workloads is a major source of $CO_2$ equivalent emissions.

For example, the $CO_2$ equivalent emission of a data center or a hybrid cloud environment is a result of running workloads on servers and their corresponding storage systems (e.g., block storage systems, filesystem storage systems, object storage systems, and the like). Entities support hybrid cloud and data center workload deployments where the deployment of these workloads can occur in any of the hybrid clouds or data centers which are spread across a plurality of different geographic areas. Each respective hybrid cloud or data center has a different $CO_2$ equivalent emission index based on the source of power and power usage effectiveness. Power usage effectiveness is a ratio that describes how efficiently a hybrid cloud or data center utilizes energy. Specifically, the power usage effectiveness describes how much energy is used by equipment (e.g., storage devices) in the hybrid cloud or data center. The ratio is the total amount of energy used by the hybrid cloud or data center equipment to the energy delivered to the hybrid cloud or data center equipment.

However, entities may struggle with managing the $CO_2$ equivalent emissions generated from their workloads running in the hybrid cloud and data center deployments. A need exists for an entity to automatically control the $CO_2$ equivalent emissions associated with its workloads running in a hybrid cloud or data center deployment. For example, workloads may generate a lot of input/output operations and data interactions with storage systems. As a result, storage systems may be a major component contributing to the $CO_2$ equivalent emission footprint of an entity. Currently, no storage system solution exists that can manage sustainability SLAs by ensuring data placed on storage is automatically managed to ensure that the least amount of $CO_2$ equivalent emission is generated while also ensuring no other performance SLA for workloads is violated.

Illustrative embodiments tag data corresponding to a particular workload with a sustainability SLA. Illustrative embodiments ensure that the sustainability SLA for that particular workload is adhered to using dynamic scheduling of that particular workload and/or tiering of that particular workload's data placement in a hybrid cloud or data center deployment. It should be noted that the workload scheduler of illustrative embodiments ensures that other performance SLA metrics in terms of performance or capacity expected from storage is not impacted while still meeting the sustainability SLA metrics. This involves illustrative embodiments categorizing workloads and identifying which workload qualifies to be tagged with a sustainability SLA for $CO_2$ equivalent emissions and which workload (e.g., a critical workload) can override the sustainability SLA.

Illustrative embodiments may automatically schedule workload migration to a different storage system or tiering the workload to a different storage type (e.g., from disk drive to a solid-state drive) in the same storage system to ensure that the $CO_2$ equivalent emissions via data access is at a minimum (e.g., complying with a sustainability SLA defined at the application data level). As used herein, a workload at the storage level is defined as a volume group (e.g., as a block of data in block storage, a set of files in a file system, or a bucket of objects in object storage) which forms a logical unit used by applications.

At the storage level, a storage system administrator may define a sustainability SLA in terms of $CO_2$ equivalent emission for a given workload (e.g., access to a block of data, a set of files, or a bucket of objects) running in a storage system that cannot generate more than X number of kilograms of $CO_2$ equivalent emission for a defined time period such as, for example, a year, 6 months, 3 months, 1 month, 2 weeks, 1 week, or any other increment of time. The workload scheduler of illustrative embodiments may adhere to the sustainability SLA tagged to the workload by dynamically moving the workload to a different storage system in the same data center or to a different storage system in a different data center to lower $CO_2$ equivalent emissions. The workload scheduler also takes into account emergency conditions such as, for example, when one or more data centers are located in a geographic region where power is mandated to be reduced due to high air temperatures and/or high pressure weather systems causing heat buildup. Thus, the workload scheduler can make different workload scheduling decisions for that defined time period.

The storage controller of illustrative embodiments also adheres to the tagged sustainability SLA for $CO_2$ equivalent emission of a given workload running on a particular storage system by automatically tiering that particular workload to an appropriate storage type (e.g., disk drive, solid-state drive, or the like) in that particular storage system or restricting access to data in that particular storage system by that particular workload when the maximum threshold level of $CO_2$ equivalent emission generated by that particular workload for the defined time period is exceeded. It should be noted that $CO_2$ equivalent emission may vary per storage type or technology.

Illustrative embodiments implement a sustainability SLA tagging system which includes the storage controller and the workload scheduler. The sustainability SLA tagging system enables a user, such as a storage system administrator or the like, to define a sustainability SLA for a given workload and then tag the data corresponding to that particular workload with the sustainability SLA. For example, the storage system administrator can utilize a graphical user interface or an API interface corresponding to the sustainability SLA tagging system to define the sustainability SLA for a given workload and then tag the data corresponding to that particular workload with the sustainability SLA. The sustainability SLA defines the maximum $CO_2$ equivalent emission by a given workload for a defined period of time (e.g., a year, month, or the like).

The storage controller monitors and records the $CO_2$ equivalent emission of a given workload in real time and compares the $CO_2$ equivalent emission of that particular workload to the sustainability SLA for that particular workload. The workload scheduler receives monitored $CO_2$ equivalent emission data of respective workloads in real time from the storage controller. The workload scheduler adheres to the sustainability SLA tagged to each respective workload by predicting whether $CO_2$ equivalent emission of a given workload will reach or exceed the maximum $CO_2$ equivalent emission threshold level defined in the sustainability SLA prior to the defined time period (e.g., year, month, or the like) being met based on analyzing the $CO_2$ equivalent emission data of respective workloads, which may have been received in real time from the storage controller, using, for example, a set of machine learning models, autoregressive integrated moving average models, linear regression models, or any combination thereof.

In response to the workload scheduler predicting that the $CO_2$ equivalent emission of a given workload will reach or exceed the maximum $CO_2$ equivalent emission threshold level defined in a sustainability SLA tagged to that particular workload prior to the defined time period being met, the workload scheduler may proactively and automatically migrate that particular workload to a different storage system (e.g., a flash storage system) based on a determination that the different storage system will consume less power for the particular workload. For example, if one storage system has a lower $CO_2$ equivalent emission footprint than another storage system, then the workload scheduler can migrate one or more workloads to that other storage system to reduce $CO_2$ equivalent emissions.

The workload scheduler is capable of managing emergency situations such as, for example, when a governmental agency mandates power reductions due to heat buildup caused by a high pressure weather system in a geographic area. During such emergency situations, the workload scheduler may make workload scheduling decisions differently to decrease the $CO_2$ equivalent emissions in that geographic area.

Similarly, the storage controller is capable of tiering or moving a particular workload currently running on a particular storage type (e.g., disk storage) to a different storage type (e.g., flash storage) to decrease $CO_2$ equivalent emissions. For example, flash storage has a lower $CO_2$ equivalent emission footprint than disk storage. Consequently, the storage controller can tier a workload, which does not need high performance (i.e., a low performance non-critical workload), to flash storage to reduce that particular workload's $CO_2$ equivalent emission. Flash storage is a solid-state storage technology that uses flash memory chips for writing and storing data, known as input/output operations per second (IOPS). Flash storage can achieve high-speed response times compared to disk storage and uses less energy than disk storage.

Additionally, the storage controller restricts access to data on a particular storage system by a workload when the workload's $CO_2$ equivalent emission exceeds the maximum allowable $CO_2$ equivalent emission threshold level for the defined time period. Furthermore, the storage controller monitors and reports the $CO_2$ equivalent emission data corresponding to each respective workload running on the storage system to the workload scheduler. The workload scheduler utilizes the $CO_2$ equivalent emission data corresponding to each respective workload running on the storage system to further train and optimize the set of machine learning models to increase prediction accuracy over time; the $CO_2$ equivalent emission data may have been received from the storage controller.

Moreover, the storage controller includes an API that allows third-party tools to interface with the storage controller. The third-party tools may include, for example, energy management tools, sustainability reporting tools, and the like. The API enables the third-party tools to access the $CO_2$ equivalent emission data collected by the storage controller and use the $CO_2$ equivalent emission data to generate reports such as, for example, workload migration reports, sustainability SLA violation reports, energy management reports for workload deployments, and the like.

Further, it should be noted that alternative illustrative embodiments may be implemented at the storage software level where the sustainability SLA is maintained or tagged at the storage software metadata level; the storage software level may be independent of block storage, filesystem storage, and object storage. As a result, alternative illustrative embodiments can initiate migration of a particular workload to an optimal storage system location or tiering to an optimal storage type in the current storage system using a set of data placement policies available with storage sub-systems to decrease $CO_2$ equivalent emissions.

Thus, illustrative embodiments provide one or more technical solutions that overcome a technical problem with controlling carbon emissions by workload at the storage level. As a result, these one or more technical solutions provide a technical effect and practical application in the field of storage systems.

With reference now to FIG. 2, a diagram illustrating an example of a carbon emission by workload management system is depicted in accordance with an illustrative embodiment. A carbon emission by workload management system 201 may be implemented in a computing environment, such as computing environment 100 in FIG. 1. For example, the carbon emission by workload management system 201 can be implemented in a data center or a hybrid cloud environment. The carbon emission by workload management system 201 is a system of hardware and software components for controlling $CO_2$ equivalent emissions by workloads at the storage level.

In this example, the carbon emission by workload management system 201 includes host 1 202, host 2 204, and host N 206. Host 1 202 can be, for example, computer 101 in FIG. 1. Host 2 204 and host N 206 can be, for example, computers in host physical machine set 142 in FIG. 1. However, it should be noted that the carbon emission by workload management system 201 is intended as an example only and not as a limitation on illustrative embodiments. For example, a carbon emission by workload management system 201 can include any number of host computers and other devices and components not shown.

In this example, storage system 1 208 corresponds to host 1 202, storage system 2 210 corresponds to host 2 204, and storage system N 212 corresponds to host N 206. For example, storage system 1 208 corresponding to host 1 202 can be storage 124 corresponding to computer 101 in FIG. 1.

In this example, host 1 202 runs workload 1 214 on volume group 1 216 of storage system 1 208. In addition, host 1 202 runs workload 2 218 on volume group 2 220 of storage system 1 208.

At 222, the workload scheduler 224 of host 1 202 migrates workload 2 218 to host N 206 in response to workload scheduler 224 predicting that workload 2 218 running on volume group 2 220 of storage system 1 208 will generate enough $CO_2$ equivalent emission to exceed a maximum $CO_2$ equivalent emission threshold level defined in a sustainability SLA corresponding to workload 2 218 prior to a specified time period being met based on analyzing $CO_2$ equivalent emission data in a time-series format corresponding to workload 2 218. The workload scheduler 224 receives the $CO_2$ equivalent emission data in the time-series format corresponding to workload 2 218 from storage controller 226 of storage system 1 208. In addition, at 228, host 1 202 migrates volume group 2 220 to storage system N 212 to run workload 2 218 on storage system N 212.

It should be noted that, in an alternative illustrative embodiment, the workload scheduler 224 can be located outside of the hosts in a separate computer, either on-premises near to the storage systems or on cloud having a connection to the storage controller 226 remotely. In another alternative illustrative embodiment, the workload scheduler 224 can be located within the storage controller 226; the storage controller 226 can also manage other storage controllers in, for example, storage system 2 210 and storage system N 212. In addition, host N 206 can be located in the same data center or hybrid cloud as host 1 202. Alternatively, host N 206 can be located in a different data center or a different hybrid cloud as host 1 202.

Figure 3A:
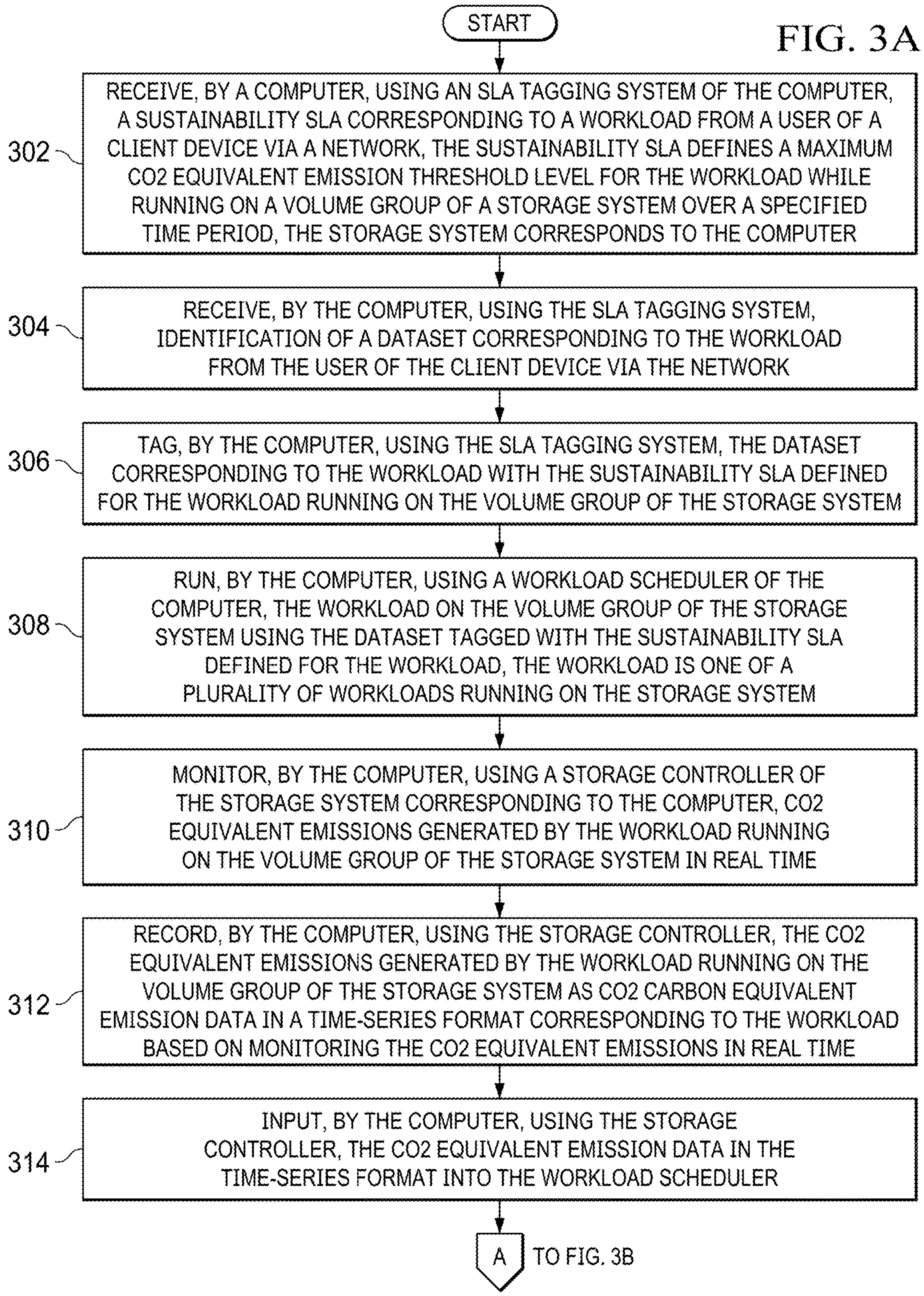
FIGS. 3A-3C are a flowchart illustrating a process for controlling $CO_2$ equivalent emissions by workloads in accordance with an illustrative embodiment.
Figure 3B:
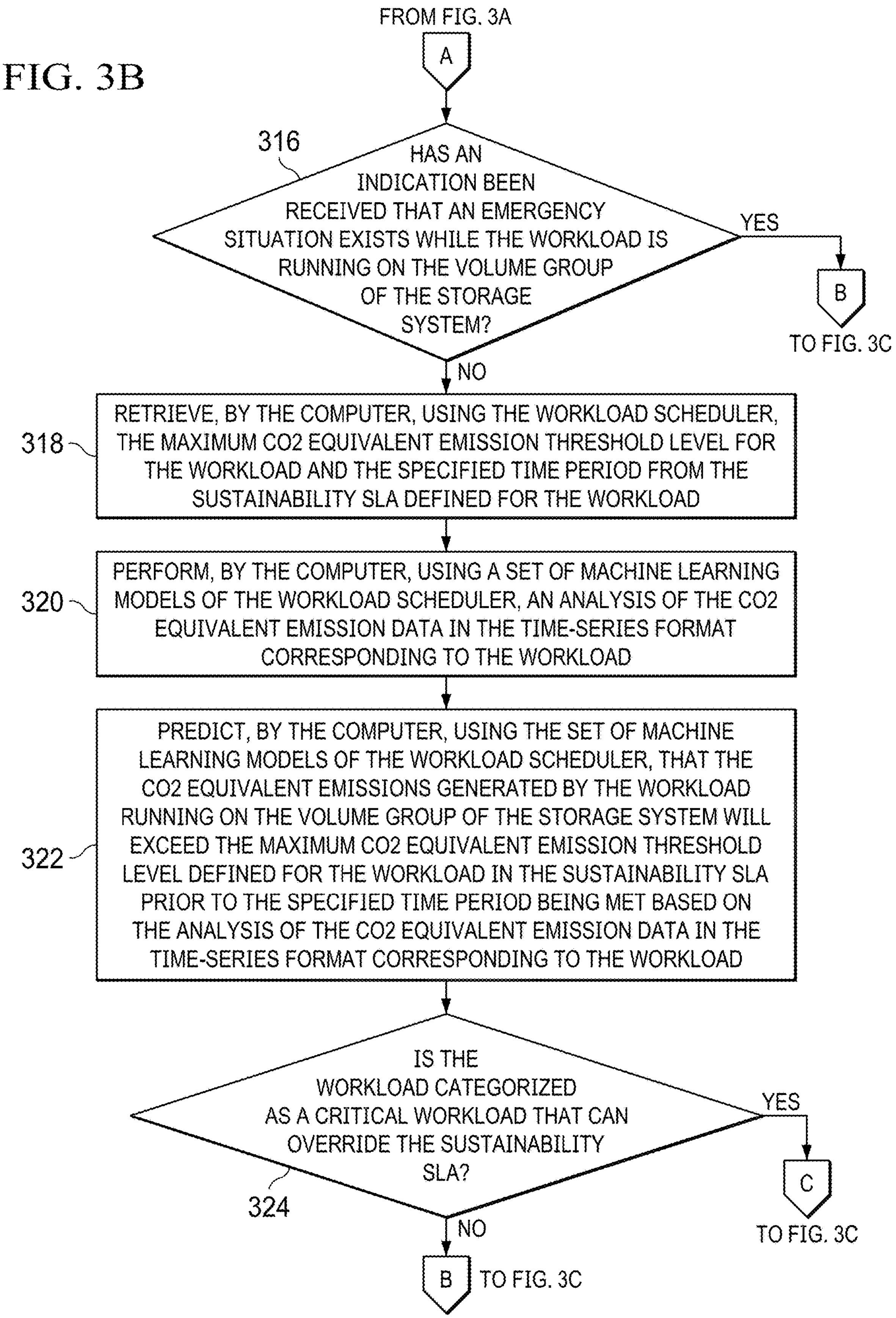
Figure 3C:
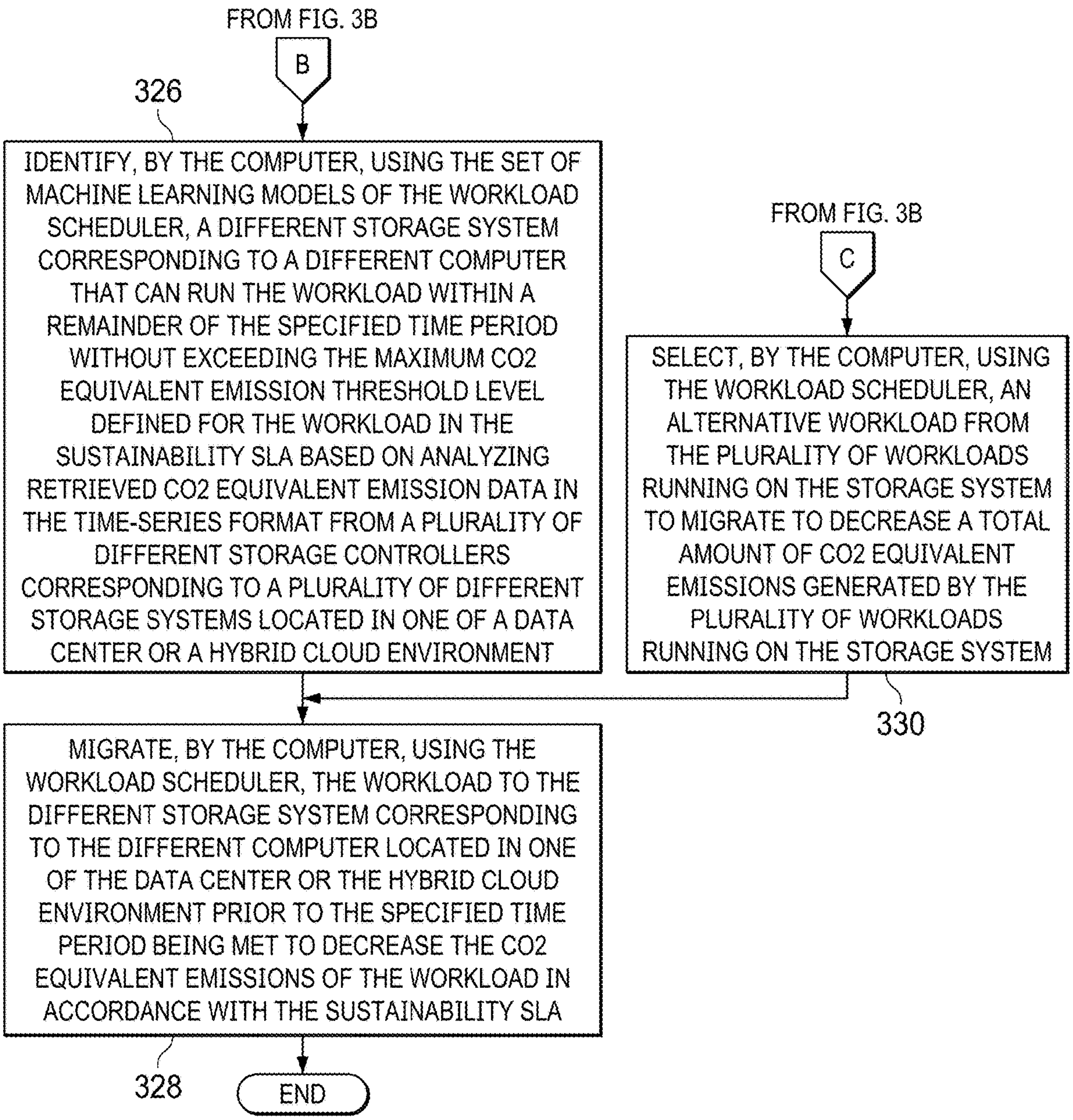

With reference now to FIGS. 3A-3C, a flowchart illustrating a process for controlling $CO_2$ equivalent emissions by workloads is shown in accordance with an illustrative embodiment. The process shown in FIGS. 3A-3C may be implemented in a computer such as, for example, computer 101 in FIG. 1 or host 1 202 in FIG. 2. For example, the process shown in FIGS. 3A-3C may be implemented by carbon emission by workload management code 200 in FIG. 1.

The process begins when the computer, using an SLA tagging system of the computer, receives a sustainability SLA corresponding to a workload from a user of a client device via a network (step 302). The sustainability SLA may define a maximum $CO_2$ equivalent emission threshold level for the workload while running on a volume group of a storage system over a specified time period. The storage system may correspond to the computer. In addition, the computer, using the SLA tagging system, receives identification of a dataset corresponding to the workload from the user of the client device via the network (step 304).

The computer, using the SLA tagging system, tags the dataset corresponding to the workload with the sustainability SLA defined for the workload running on the volume group of the storage system (step 306). The computer, using a workload scheduler of the computer, runs the workload on the volume group of the storage system using the dataset tagged with the sustainability SLA defined for the workload (step 308). The workload is one of a plurality of workloads running on the storage system.

Using a storage controller of the storage system corresponding to the computer, the computer monitors $CO_2$ equivalent emissions generated by the workload running on the volume group of the storage system in real time (step 310). The computer, using the storage controller, records the $CO_2$ equivalent emissions generated by the workload running on the volume group of the storage system as $CO_2$ equivalent emission data in a time-series format corresponding to the workload based on monitoring the $CO_2$ equivalent emissions in real time (step 312). Using the storage controller, the computer inputs the $CO_2$ equivalent emission data in the time-series format into the workload scheduler (step 314).

The computer makes a determination as to whether an indication has been received that an emergency situation exists while the workload is running on the volume group of the storage system (step 316). If the computer determines that the indication has been received that the emergency situation exists while the workload is running on the volume group of the storage system, it results in a yes output of step 316, and then the process proceeds to step 326. If the computer determines that no indication has been received that an emergency situation exists while the workload is running on the volume group of the storage system, it results in a no output of step 316, then the computer, using the workload scheduler, retrieves the maximum $CO_2$ equivalent emission threshold level for the workload and the specified time period from the sustainability SLA defined for the workload (step 318).

Using a set of machine learning models of the workload scheduler, the computer performs an analysis of the $CO_2$ equivalent emission data in the time-series format corresponding to the workload (step 320). Again using the set of machine learning models of the workload scheduler, the computer predicts that the $CO_2$ equivalent emissions generated by the workload running on the volume group of the storage system will exceed the maximum $CO_2$ equivalent emission threshold level defined for the workload in the sustainability SLA prior to the specified time period being met based on the analysis of the $CO_2$ equivalent emission data in the time-series format corresponding to the workload (step 322).

The computer also makes a determination as to whether the workload is categorized as a critical workload that can override the sustainability SLA (step 324). If the computer determines that the workload is not categorized as a critical workload that can override the sustainability SLA, it results in a no output of step 324. As a result of the no output of step 324, the computer, using the set of machine learning models of the workload scheduler, identifies a different storage system corresponding to a different computer that can run the workload within a remainder of the specified time period without exceeding the maximum $CO_2$ equivalent emission threshold level defined for the workload in the sustainability SLA based on analyzing retrieved $CO_2$ equivalent emission data in the time-series format from a plurality of different storage controllers corresponding to a plurality of different storage systems located in one of a data center or a hybrid cloud environment (step 326). Using the workload scheduler, the computer migrates the workload to the different storage system corresponding to the different computer located in one of the data center or the hybrid cloud environment prior to the specified time period being met to decrease the $CO_2$ equivalent emissions of the workload in accordance with the sustainability SLA (step 328). Thereafter, the process terminates.

Returning to step 324, if the computer determines that the workload is categorized as a critical workload that can override the sustainability SLA, it results in a yes output of step 324. As a result of the yes output of step 324, the computer, using the workload scheduler, selects an alternative workload from the plurality of workloads running on the storage system to migrate to decrease a total amount of $CO_2$ equivalent emissions generated by the plurality of workloads running on the storage system (step 330). Thereafter, the process returns to step 328 where the computer, using the workload scheduler, migrates the alternative workload to a different storage system corresponding to a different computer located in either the data center or the hybrid cloud environment prior to the specified time period being met.

Thus, illustrative embodiments of the present disclosure provide a computer-implemented method, computer system, and computer program product for controlling $CO_2$ equivalent emissions by workloads at the storage system level. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

identifying, using a set of machine learning models, a storage system that can run a workload within a remainder of a specified time period without exceeding a maximum carbon dioxide ($CO_2$) equivalent emission threshold level defined for the workload in a sustainability service level agreement (SLA) based on analyzing retrieved $CO_2$ equivalent emission data in a time-series format from a plurality of storage controllers corresponding to a plurality of storage systems; and migrating the workload to the identified storage system prior to the specified time period being met to decrease $CO_2$ equivalent emissions of the workload in accordance with the sustainability SLA.

2. The method of claim 1, further comprising:

performing, using the set of machine learning models, an analysis of the retrieved $CO_2$ equivalent emission data in the time-series format corresponding to the workload; and predicting, using the set of machine learning models, that the $CO_2$ equivalent emissions generated by the workload running on a volume group of a first storage system will exceed the maximum $CO_2$ equivalent emission threshold level defined for the workload in the sustainability SLA prior to the specified time period being met based on the analysis of the retrieved $CO_2$ equivalent emission data in the time-series format corresponding to the workload.

3. The method of claim 1, further comprising:

receiving the sustainability SLA corresponding to the workload from a user of a client device via a network, the sustainability SLA defines the maximum $CO_2$ equivalent emission threshold level for the workload while running on a volume group of a first storage system over the specified time period;

receiving identification of a dataset corresponding to the workload from the user of the client device via the network; and tagging the dataset corresponding to the workload with the sustainability SLA defined for the workload running on the volume group of the first storage system.

4. The method of claim 1, further comprising:
running the workload on a volume group of a first storage system using a dataset tagged with the sustainability SLA defined for the workload, the workload is one of a plurality of workloads running on the first storage system; and
monitoring the $CO_2$ equivalent emissions generated by the workload running on the volume group of the first storage system in real time.

5. The method of claim 1, further comprising:
recording the $CO_2$ equivalent emissions generated by the workload running on a volume group of a first storage system as the retrieved $CO_2$ equivalent emission data in the time-series format corresponding to the workload based on monitoring the $CO_2$ equivalent emissions in real time; and
inputting the retrieved $CO_2$ equivalent emission data in the time-series format into a workload scheduler.

6. The method of claim 1, further comprising:
determining whether an indication has been received that an emergency situation exists while the workload is running on a volume group of a first storage system; and
responsive to determining that no indication has been received that an emergency situation exists while the workload is running on the volume group of the first storage system, retrieving the maximum $CO_2$ equivalent emission threshold level for the workload and the specified time period from the sustainability SLA defined for the workload.

7. The method of claim 6, further comprising:
responsive to determining that the indication has been received that the emergency situation exists while the workload is running on the volume group of the first storage system, identifying, using the set of machine learning models, the storage system that can run the workload within the remainder of the specified time period without exceeding the maximum $CO_2$ equivalent emission threshold level defined for the workload in the sustainability SLA based on analyzing the retrieved $CO_2$ equivalent emission data in the time-series format from the plurality of storage controllers corresponding to the plurality of storage systems.

8. The method of claim 6, further comprising:
determining whether the workload is categorized as a critical workload that can override the sustainability SLA; and
responsive to determining that the workload is categorized as the critical workload that can override the sustainability SLA, selecting an alternative workload from a plurality of workloads running on the first storage system to migrate to decrease a total amount of $CO_2$ equivalent emissions generated by the plurality of workloads running on the first storage system.

9. A computer system comprising:
a processor set;
one or more computer-readable storage media; and
program instructions stored on the one or more computer-readable storage media to cause the processor set to perform operations comprising:
identifying, using a set of machine learning models, a storage system that can run a workload within a remainder of a specified time period without exceeding a maximum carbon dioxide ($CO_2$) equivalent emission threshold level defined for the workload in a sustainability service level agreement (SLA) based on analyzing retrieved $CO_2$ equivalent emission data in a time-series format from a plurality of storage controllers corresponding to a plurality of storage systems; and
migrating the workload to the identified storage system prior to the specified time period being met to decrease $CO_2$ equivalent emissions of the workload in accordance with the sustainability SLA.

10. The computer system of claim 9, wherein the operations further comprise:
performing, using the set of machine learning models, an analysis of the retrieved $CO_2$ equivalent emission data in the time-series format corresponding to the workload; and
predicting, using the set of machine learning models, that the $CO_2$ equivalent emissions generated by the workload running on a volume group of a first storage system will exceed the maximum $CO_2$ equivalent emission threshold level defined for the workload in the sustainability SLA prior to the specified time period being met based on the analysis of the retrieved $CO_2$ equivalent emission data in the time-series format corresponding to the workload.

11. The computer system of claim 9, wherein the operations further comprise:
receiving the sustainability SLA corresponding to the workload from a user of a client device via a network, the sustainability SLA defines the maximum $CO_2$ equivalent emission threshold level for the workload while running on a volume group of a first storage system over the specified time period;
receiving identification of a dataset corresponding to the workload from the user of the client device via the network; and
tagging the dataset corresponding to the workload with the sustainability SLA defined for the workload running on the volume group of the first storage system.

12. The computer system of claim 9, wherein the operations further comprise:
running the workload on a volume group of a first storage system using a dataset tagged with the sustainability SLA defined for the workload, the workload is one of a plurality of workloads running on the first storage system; and
monitoring the $CO_2$ equivalent emissions generated by the workload running on the volume group of the first storage system in real time.

13. The computer system of claim 9, wherein the operations further comprise:
recording the $CO_2$ equivalent emissions generated by the workload running on a volume group of a first storage system as the retrieved $CO_2$ equivalent emission data in the time-series format corresponding to the workload based on monitoring the $CO_2$ equivalent emissions in real time; and
inputting the retrieved $CO_2$ equivalent emission data in the time-series format into a workload scheduler.

14. A computer program product comprising:
one or more computer-readable storage media; and
program instructions stored on the one or more computer-readable storage media to perform operations comprising:
identifying, using a set of machine learning models, a storage system that can run a workload within a remainder of a specified time period without exceeding a maximum carbon dioxide ($CO_2$) equivalent emission threshold level defined for the workload in a sustainability service level agreement (SLA) based on analyzing retrieved $CO_2$ equivalent emission data in a time-series format from a plurality of storage controllers corresponding to a plurality of storage systems; and migrating the workload to the identified storage system prior to the specified time period being met to decrease $CO_2$ equivalent emissions of the workload in accordance with the sustainability SLA.

15. The computer program product of claim 14, wherein the operations further comprise:

performing, using the set of machine learning models, an analysis of the retrieved $CO_2$ equivalent emission data in the time-series format corresponding to the workload; and predicting, using the set of machine learning models, that the $CO_2$ equivalent emissions generated by the workload running on a volume group of a first storage system will exceed the maximum $CO_2$ equivalent emission threshold level defined for the workload in the sustainability SLA prior to the specified time period being met based on the analysis of the retrieved $CO_2$ equivalent emission data in the time-series format corresponding to the workload.

16. The computer program product of claim 14, wherein the operations further comprise:

receiving the sustainability SLA corresponding to the workload from a user of a client device via a network, the sustainability SLA defines the maximum $CO_2$ equivalent emission threshold level for the workload while running on a volume group of a first storage system over the specified time period;

receiving identification of a dataset corresponding to the workload from the user of the client device via the network; and tagging the dataset corresponding to the workload with the sustainability SLA defined for the workload running on the volume group of the first storage system.

17. The computer program product of claim 14, wherein the operations further comprise:

running the workload on a volume group of a first storage system using a dataset tagged with the sustainability SLA defined for the workload, the workload is one of a plurality of workloads running on the first storage system; and monitoring the $CO_2$ equivalent emissions generated by the workload running on the volume group of the first storage system in real time.

18. The computer program product of claim 14, wherein the operations further comprise:

recording the $CO_2$ equivalent emissions generated by the workload running on a volume group of a first storage system as the retrieved $CO_2$ equivalent emission data in the time-series format corresponding to the workload based on monitoring the $CO_2$ equivalent emissions in real time; and inputting the retrieved $CO_2$ equivalent emission data in the time-series format into a workload scheduler.

19. The computer program product of claim 14, wherein the operations further comprise:

determining whether an indication has been received that an emergency situation exists while the workload is running on a volume group of a first storage system; and responsive to determining that no indication has been received that an emergency situation exists while the workload is running on the volume group of the first storage system, retrieving the maximum $CO_2$ equivalent emission threshold level for the workload and the specified time period from the sustainability SLA defined for the workload.

20. The computer program product of claim 19, wherein the operations further comprise:

responsive to determining that the indication has been received that the emergency situation exists while the workload is running on the volume group of the first storage system, identifying, using the set of machine learning models, the storage system that can run the workload within the remainder of the specified time period without exceeding the maximum $CO_2$ equivalent emission threshold level defined for the workload in the sustainability SLA based on analyzing the retrieved $CO_2$ equivalent emission data in the time-series format from the plurality of storage controllers corresponding to the plurality of storage systems.

* * * * *